Figure 1:
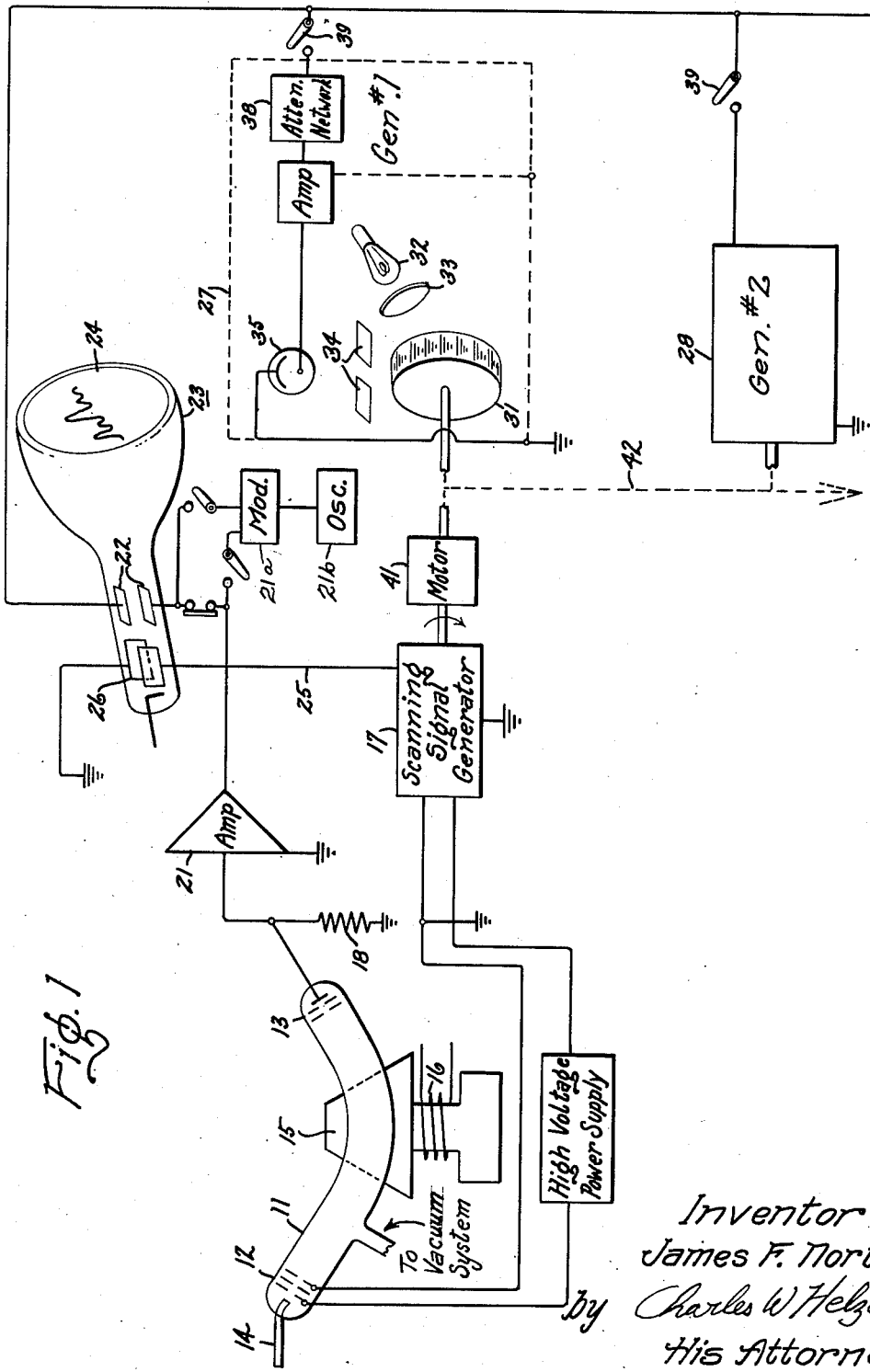

May 13, 1958  J. F. NORTON  2,834,888
DATA ANALYZING EQUIPMENT
Filed Dec. 31, 1954  2 Sheets—Sheet 2

2a  MIXTURE – GASES #1 + #2

2b  CRACKING PATTERN – GAS #1

2c  CRACKING PATTERN – GAS #2

2d  NULL – MIXTURE WITH GASES 1+2 SUBTRACTED

Inventor
James F. Norton
by Charles W. Helzer
His Attorney

United States Patent Office 2,834,888
Patented May 13, 1958

2,834,888
DATA ANALYZING EQUIPMENT

James F. Norton, Schenectady, N. Y., assignor to General Electric Company, a corporation of New York Application December 31, 1954, Serial No. 479,166

12 Claims. (Cl. 250—41.9)

The present invention relates to a data analyzing system.

More particularly, the invention relates to a system for analyzing the output data of spectrum analysis types of instruments, such as to mass spectrometer, in a quick and efficient manner.

The present methods of analyzing the output data from spectrum analysis types of instruments are both detailed and time consuming, requiring a considerable number of complex mathematical computations. While there are a few known techniques of using digital type automatic calculating machines for doing this job satisfactorily, the machines are relatively expensive, and generally cannot be justified in most applications. Because of this situation, there is a definite need for a relatively inexpensive yet accurate and simple analyzer of the output data of spectrum analysis types of instruments.

It is therefore one object of the invention to provide a new and improved analog type analyzer for use with spectrum analysis types of instruments such as the mass spectrometer, for analyzing the output data from the instrument in a quick and accurate manner.

Another object of the invention is to provide an analyzer incorporating the above set forth characteristics which is simple in design and relatively inexpensive to manufacture.

In practicing the invention, a data analyzer is provided which includes an oscilloscope together with means for supplying the output signal from a spectrum analysis type of instrument, such as a mass spectrometer, to one set of deflection elements of the oscilloscope. Another connection is provided for supplying a synchronizing signal to the remaining transversely disposed set of deflecting elements of the oscilloscope from the scanning control signal generator that also supplies the scanning signal to the spectrum analysis instrument for scanning the operation thereof over some predetermined range of values. Additionally, a plurality of calibration signal memories, henceforth called cracking pattern generators, are provided which are operated in synchronism with the scanning control signal generator for developing a number of electric signals representative, in the mass spectrometer case, of the cracking patterns of constituent gases that compose the various gaseous mixtures to be analyzed by the analyzer. The output signals from the cracking pattern generators are selectively connectable to the first set of deflection elements of the oscilloscope in phase opposition to the output signal supplied thereto from the spectrum analysis instrument through respective selector switches and associated calibrated attenuators. By reason of this construction, the various cracking pattern generator signals can be subtracted from the output signal of the spectrum analysis instrument to thereby effect zero deflection of the beam in the oscilloscope, and a measure of the magnitude of the cracking pattern signals required to effect such zero deflection then provides an indication of the quantity, which in the mass spectrometer case, are the various partial pressures, of the components comprising the mixture.

Figure 2:
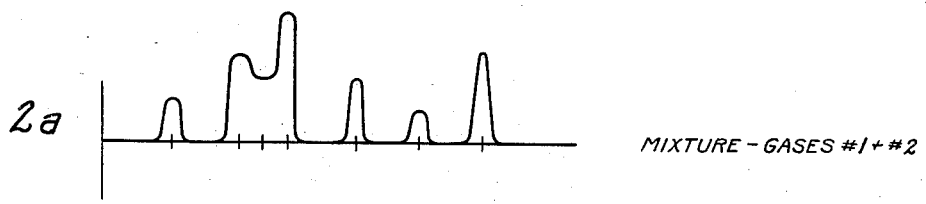
Figure 2:
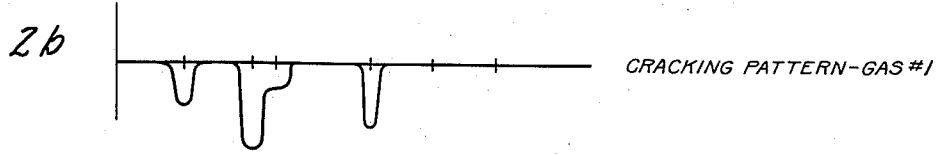
Figure 2:
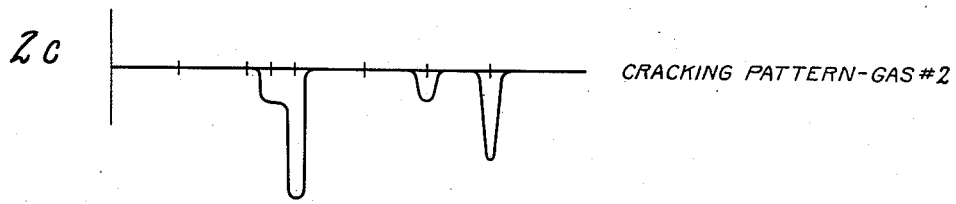
Figure 2:
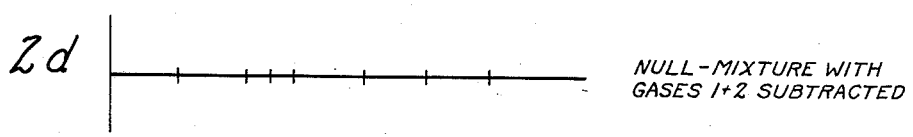

Other objects, features, and many of the attendant advantages of this invention will be appreciated more readily as the same becomes better understood by reference to the following detailed description, when considered in connection with the accompanying drawings, wherein:

Fig. 1 is a schematic circuit diagram of a data analyzing system constructed in accordance with the invention and illustrates the same used in conjunction with a mass spectrometer type of spectrum analysis instrument; and Fig. 2 is a series of graphs of the voltage waveshapes appearing on the fluorescent screen of the oscilloscope comprising a part of the analyzing system shown in Fig. 1, and portrays the manner in which the analyzing system operates to effect an analysis of the output data from a mass spectrometer.

The embodiment of the invention shown in Fig. 1 of the drawings is utilized in conjunction with a mass spectrometer instrument for analyzing various mixtures of gases. The mass spectrometer comprises a generally boomerang shaped envelope 11 which has an ion chamber 12 supported at one end thereof, and an ion detector or collector assembly 13 supported at the opposite end. Gaseous mixtures to be analyzed are introduced into the ion chamber region 12 through an inlet tube 14 where the mixture is ionized by a beam of electron. The ions thus formed are accelerated by a voltage supplied in part from a scanning control signal generator, to develop a heterogeneous beam of ions having different mass-to-charge ratios, and the ion beam is projected into the analyzer region of the tube 11. In the analyzer region of the tube, the heterogeneous ion beam is acted on by a magnetic field produced by a magnet assembly 15. The magnetic field causes the accelerated ions in the beam to follow different paths of curvature determined by their mass-to-charge ratios, and hence, effects a separation of the ions into a number of homogeneous ion beams each one made up of ions having the same mass-to-charge ratio. The voltage applied to the ion source is then controlled by the scanning control signal supplied from generator 17 to sequentially focus the respective ion beams thus separated upon the detector or collector assembly 13, and results in producing a number of pulsed output signals at the collector which proves a measure of the intensity of the respective ion beams, and, hence, of the quantity of the components producing the ions comprising the beam. The collection of ions in the present disclosure should be done with a collector and amplifier having a short time constant. The determining factor in the rate of sweep of the electron beam across the oscilloscope will be the time constant of the input circuit. Another ion detector which would be appropriate for this application is the phosphor scintillation detector using the electron multiplication technique. For a more detailed description of the construction and operation of mass spectrometers, reference is made to an article entitled "Modern Mass Spectroscopy" by Mark G. Ingram, appearing in Advances in Electronics I, page 219, published by Academic Press, Inc., New York, N. Y. For purposes of the present disclosure, however, the above brief description is believed to be adequate.

The output signal appearing at the detector or collector 13 of the mass spectrometer, is supplied through an amplifier 21 to one of the vertical deflection elements 22 of a cathode ray oscilloscope 23. The cathode ray oscilloscope 23 has a fluorescent screen 24 in one end thereof upon which an electron beam impinges. The electron beam is produced by a cathode supported in the end of the tube 23 remote from screen 24, and is formed into a beam of electrons by suitable focusing electrodes. A sweep signal supplied from the scanning signal generator 17 through a conductor 25 to the horizontal deflection elements 26 of the oscilloscope, cause the electron beam to be swept horizontally from one side of the screen 24 to the other at some preset rate of travel. Since the sweep signal is derived from the scanning signal generator 17 which also causes the ion accelerating voltage of the mass spectrometer to scan each of the various beams of homogeneous ions having characteristic mass-to-charge ratios, across the collector assembly 13, the sweep rate of the oscilloscope is synchronized with the scanning through the mass ranges of the mass spectrometer. Consequently, the output signal of the mass spectrometer will appear as shown in Fig. 2a of the drawings wherein it can be seen that as the magnet analyzer field causes the various homogeneous ion beams to be swept past the detector or collector assembly, output signal pulses will occur due to increased collection of ions by the detector or collector assembly, and these pulses when supplied to the cathode ray oscilloscope will appear as shown. This is a typical output data curve of a spectrum analysis type of instrument such as the mass spectrometer.

In order to obtain information concerning the various percentages of the component gases comprising the mixture introduced into the mass spectrometer in the past, it has been necessary to mentally calculate from previous information concerning the cracking pattern of pure gases, which portion of the transient signal pulses shown in Fig. 2a is due to a particular pure gas, and mathematically computing how much of the gas is present in the mixture. It is believed obvious, that such a mental process of evaluation of the output data of the instrument is both laborious and time consuming. Consequently, it was necessary to obtain some means for automatically analyzing this output data. While digital computers are capable of such analysis, it is believed apparent that these computers are quite expensive, and cannot be justified in a large number of applications. Hence, the need existed for a cheap and yet accurate system of analysis.

To meet the need cited above, the present invention was developed, and incorporates a cathode ray oscilloscope, such as that shown at 23. In addition to the oscilloscope, the analyzer comprising the present invention further includes a plurality of calibration signal generators, which in the specific example disclosed utilizing a mass spectrometer, comprise cracking pattern signal generators 27, 28, and as many others as are required in order to handle the mixtures of gases to be analyzed. Each of the cracking pattern signal generators 27, 28, etc., may comprise magnetic tape recorders, magnetic drum, or any other suitable electric signal memory device whose operation can be synchronized with the scanning signal generator 17. In the instant invention, however, these generators preferably comprise a rotatable drum 31 having a cylindrical outer surface on which the graph of the cracking pattern of a pure gas is formed. In developing this memory signal, the output signal for a pure gas from a mass spectrometer may be supplied through the amplifier 21, to a modulator 21a that may be switched in circuit relationship with the oscilloscope 23 in conjunction with an oscillator 21b through suitable selector switches. By this arrangement, the output appearing on the oscilloscope 23 produces a cracking pattern of that particular pure gas which is a modulated signal. This pattern may be recorded by means of a Polaroid Land camera which takes a picture of the pattern presented by the oscilloscope, and the picture mounted on the outer surface of the rotatable drum 31. The pattern may also be treated with a highly reflective material so that the pattern itself presents a highly reflective surface. This pattern is then illuminated from a light source 32 through a suitable projection lens assembly 33, and light reflected pattern in particular, is scanned across a suitable mask 34 having an aperture therein which allows light passing therethrough to impinge upon a photocell 35. The photocell 35 operates to produce electrically the pattern portrayed optically on the surface of the drum 31. The electric signal thus produced is supplied through a precision variable attenuator network 38 to the remaining deflection element 22 of the oscilloscope in phase opposition to the output signal supplied from the mass spectrometer 11. Each of the variable attenuators 38 and cracking pattern generators are selectively connectable in circuit relationship with the oscilloscope 23 through a selector switch 39 which allow selection of various cracking pattern signals to be supplied to the oscilloscope.

In operation, the drum 31 is rotated by a motor 41 that is also mechanically connected to the scanning signal generator 17 so as to drive the drum and the generator in synchronism. This motor is connected through a suitable shafting arrangement 42 to all of the rotatable drums in each of the signal generators 27, 28, etc. Consequently, it can be appreciated that the cracking patterns formed on the outer surface of each of the drums 31 will be scanned past the photocell units 35 thereof at the same rate of operation of the mass spectrometer is scanned through its predetermined mass range.

The manner in which the analyzer operates is best illustrated in Fig. 2 of the drawings, wherein Fig. 2a shows a composite output signal from a mass spectrometer as it would appear on the screen of the cathode ray oscilloscope 23. Assuming that the mixture illustrated in Fig. 2a is composed of constituent gases whose cracking patterns are generated by generators 27, 28, each of the selector switches 39 to these generators would be closed, and the signals supplied to the vertical deflection element of the cathode ray oscilloscope in phase opposition to the output signal from the mass spectrometer. Fig. 2b for example, illustrates a signal that would be supplied from the generator 27, and Fig. 2c illustrates a signal that would be supplied from generator 28. Each of the variable attenuator networks 38 is then adjusted to provide just the proper amount of these signals to the deflecting element to null out the mixture signal illustrated in Fig. 2a. Upon this occurring, the screen 24 of the cathode ray oscilloscope should appear as shown in Fig. 2d. At this point, the settings of the variable attenuator networks 38 provide a measurement of the percentages of each of the mixtures, and this information can then be converted to partial pressures of each of the components of the gas mixture. It can be appreciated, that many more than just two cracking pattern signal generators can be supplied in order to effectively null out the voltage waveshape illustrated on the screen 24 of the oscilloscope. In this case, information as to the constituents of the gaseous mixture portrayed is provided by knowledge of which cracking pattern signal generators have to be switched into circuit relationship with the oscilloscope. In any practical embodiment of the invention, it can be assumed that the switches 39 and the variable resistors 38 would be mounted on a common board so as to be readily accessible for operation and reading.

From the foregoing description, it can be appreciated that the invention provides a new and improved analog type of analyzing system for use with mass spectrometers and other spectrum analysis types of instruments for analyzing the output data therefrom in a quick and accurate manner. This system accomplishes the above set forth objectives, and yet it is simple in design and relatively inexpensive to manufacture.

Obviously, other modifications and variations in the present invention are possible in the light of the above teachings. It is, therefore, to be understood that changes may be made herein which are within the full intended scope of the invention which are defined by the appended claims.

What I claim as new and desire to secure by Letters Patent of the United States is:

1. A data analyzer for spectrum analysis instruments comprising an oscilloscope, means for supplying the electric output signal from a spectrum analysis device to one set of deflection elements of said oscilloscope, generator means for producing electric signals representative of the calibration of constituents that compose the various mixtures to be analyzed, means for coupling the output from said generator means to said one set of deflection elements in phase opposition to the output signal from said spectrum analysis device, and means for supplying a synchronizing signal to the remaining set of transverse deflecting elements of said oscilloscope for sweeping the beam of the oscilloscope in synchronism with the scanning through the range of the spectrum analysis device.

2. A data analyzer for a mass spectrometer comprising an oscilloscope, means for supplying the electric output signal from a mass spectrometer to one set of deflection elements of said oscilloscope, generator means for producing electric signals representative of the cracking patterns of constituent gases that compose the various gaseous mixtures to be analyzed, means for coupling the output from said generator means to said one set of deflection elements in phase opposition to the output signal from said mass spectrometer, means for adjusting the magnitude of said cracking pattern signals to any desired value, and means for supplying a synchronizing signal to the remaining set of transverse deflecting elements of said oscilloscope for sweeping the beam of the oscilloscope in synchronism with the scanning through the mass range of the mass spectrometer.

3. A data analyzer for a mass spectrometer comprising an oscilloscope, means for supplying the output signal from a mass spectrometer to one set of deflection elements of said oscilloscope, a plurality of cracking pattern generators for producing electric signals representative of the cracking patterns of constituent gases that compose the various gaseous mixtures to be analyzed, means for selectively coupling the output from any desired one of said cracking pattern generators to said one set of deflection elements in phase opposition to the output signal from said mass spectrometer, and means for supplying a synchronizing signal to the remaining set of transverse deflecting elements of said oscilloscope for sweeping the beam of the oscilloscope in synchronism with the scanning through the mass range of the mass spectrometer.

4. A data analyzer for a mass spectrometer comprising an oscilloscope, means for supplying the output signal from a mass spectrometer to one set of deflection elements of said oscilloscope, a plurality of cracking pattern generators synchronized in operation with the range scanning of the mass spectrometer for producing electric signals representative of the cracking patterns of constituent gases that compose the various gaseous mixtures being analyzed, means for selectively coupling the output from any desired one of said cracking pattern generators to said one set of deflection elements in phase opposition to the output signal from said mass spectrometer, means for adjusting the magnitude of said cracking pattern generator signals to any desired value, and means for supplying the range scanning signal applied to the mass spectrometer to a remaining set of deflecting elements of said oscilloscope which are disposed transversely with respect to said one set for sweeping the beam of the oscilloscope in synchronism with the scanning through the mass range of the mass spectrometer.

5. A data analyzer for a mass spectrometer comprising an oscilloscope, means for supplying the output signal from a mass spectrometer to one set of deflection elements of said oscilloscope, a plurality of cracking pattern generators for producing electric signals representative of the cracking patterns of constituent gases that compose the various gaseous mixtures to be analyzed, means for coupling the output from said cracking pattern generators to said one set of deflection elements in phase opposition to the output signal from said mass spectrometer, a plurality of variable attenuators, each of said attenuators being connected in circuit relationship with a respective one of said cracking pattern generators for adjusting the magnitude of the signal supplied thereby to any desired value, and means for supplying the range scanning signal applied to the mass spectrometer to a remaining set of deflecting elements of said oscilloscope which are disposed transversely with respect to said one set for sweeping the beam of the oscilloscope in synchronism with the scanning through the mass range of the mass spectrometer.

6. A data analyzer for a mass spectrometer comprising an oscilloscope, means for supplying the output signal from a mass spectrometer to one set of deflection elements of said oscilloscope, a plurality of cracking pattern generators synchronized in operation with the range scanning of the mass spectrometer for producing electric signals representative of the cracking pattern of constituent gases that compose the various gaseous mixtures being analyzed, a plurality of electric switches each one connected in circuit relationship with a respective cracking pattern generator for selectively coupling the output from its associated generator to said one set of deflection elements in phase opposition to the output signal from said mass spectrometer, a plurality of variable attenuators, each of said attenuators being connected in circuit relationship with a respective cracking pattern generator and its associated switch for adjusting the magnitude of the signal supplied by the generator to any desired value, and means for supplying the range scanning signal applied to the mass spectrometer to a remaining set of deflecting elements of said oscilloscope which are transversely disposed with respect to said one set for sweeping the beam of the oscilloscope in synchronism with the scanning through the mass range of the mass spectrometer.

7. A data analyzer for a spectrum analysis device comprising an oscilloscope, means for supplying the output signal from the spectrum analysis device to one set of deflection elements of said oscilloscope, a scanning signal generator connected to said spectrum analysis device for scanning the operation thereof over a desired range, a plurality of constituent calibration generators for producing electric signals representative of the calibration patterns of constituents that compose the various mixtures to be analyzed, means for synchronizing the operation of said calibration generators with said scanning signal generator, means for supplying the output signals from said calibration generators to said previously mentioned set of deflection elements of said oscilloscope in phase opposition to the output signal from said spectrum analysis device, and means for supplying the scanning control signal from said scanning signal generator to the remaining transversely disposed set of deflection elements of said oscilloscope.

8. A data analyzer for a mass spectrometer comprising an oscilloscope, means for supplying the output signal from a mass spectrometer to one set of deflection elements of said oscilloscope, a motor, a scanning signal generator connected to said motor, means connecting the output scanning control signal from said generator to said mass spectrometer for scanning the operation thereof over a desired mass range, a plurality of cracking pattern generators for producing electric signals representative of the cracking patterns of constituent gases that compose the various gaseous mixtures to be analyzed, means for operatively coupling said motor to said cracking pattern generators for deriving the same in synchronism with said scanning signal generator, means for supplying the output signals from said cracking pattern generators to said previously mentioned set of deflection elements of said oscilloscope in phase opposition to the output signal from said mass spectrometer, and means for supplying the scanning control signal from said scanning signal generator to the remaining transversely disposed set of deflection elements of said oscilloscope.

9. A data analyzer for a mass spectrometer comprising an oscilloscope, means for supplying the output signal from a mass spectrometer to one set of deflection elements of said oscilloscope, a scanning signal generator connected to said mass spectrometer for scanning the operation thereof over a desired mass range, a plurality of cracking pattern generators for producing electric signals representative of the cracking patterns of constituent gases that compose the various gaseous mixtures to be analyzed, means for synchronizing the operation of said cracking pattern generators with said scanning signal generator, means for selectively supplying the output signals from said cracking pattern generators to said previously mentioned set of deflection elements of said oscilloscope in phase opposition to the output signal from said mass spectrometer, means for adjusting the magnitude of the cracking pattern signals to any desired value, and means for supplying the scanning control signal from said scanning signal generator to the remaining transversely disposed set of deflection elements of said oscilloscope.

10. A data analyzer for spectrum analysis instruments, comprising an oscilloscope, means to apply the output signal of a spectrum analysis instrument to said oscilloscope to provide a visual representation thereof, reference means to produce a multiplicity of signals representative of various constituent elements of the mixture to be analyzed, means to apply the output of said reference means to said oscilloscope in phase opposition to the output of said spectrum analysis instrument whereby said visual representation is erased and the composition of the mixture may be determined.

11. A data analyzer for spectrum analysis instruments, comprising an oscilloscope, means to deflect the electron beam of said oscilloscope in synchronism with and in response to the output of this spectrum analysis instrument, reference means for producing signals representative of various constituent elements of the mixture to be analyzed, means to apply the output of said reference means to said oscilloscope in phase opposition to the output of said spectrum analysis instrument whereby the composition of the mixture may be determined.

12. A data analyzer for mass spectrum analysis instruments, comprising an oscilloscope, means to deflect the electron beam of said oscilloscope in one direction in synchronism with the scanning of the spectrum analysis instrument, means to deflect said electron beam in another direction in response to the output from said spectrum analysis instrument, reference means for producing signals representative of elements present in the mixtures to be analyzed, means coupling the output from said reference means to said oscilloscope in phase opposition to the output of said spectrum analysis instrument whereby the composition of the mixture may be determined.

References Cited in the file of this patent

UNITED STATES PATENTS

| | | |
|---|---|---|
| 2,331,189 | Hipple | Oct. 5, 1943 |
| 2,410,424 | Brown | Nov. 5, 1946 |
| 2,455,052 | Fisher | Nov. 30, 1948 |